United States Patent
Furutani et al.

Patent Number: 6,103,677
Date of Patent: Aug. 15, 2000

[54] LUBRICANT AND MAGNETIC RECORDING MEDIUM COMPRISING THE SAME

[75] Inventors: Takahiro Furutani, Otokuni-gun; Sayaka Shinomoto, Kyoto; Tetsuo Mizumura, Kitasouma-gun, all of Japan

[73] Assignee: Hitachi Maxell, Ltd., Osaka-fu, Japan

[21] Appl. No.: 09/247,513

[22] Filed: Feb. 10, 1999

[30] Foreign Application Priority Data

Feb. 10, 1998 [JP] Japan .................................. 10-028292

[51] Int. Cl.$^7$ ........................... C01M 131/12; G11B 5/72
[52] U.S. Cl. ........................ 508/465; 508/497; 508/509; 560/192; 560/227; 428/422; 428/695
[58] Field of Search ............................ 508/465; 560/192, 560/227

[56] References Cited

U.S. PATENT DOCUMENTS

| | | | |
|---|---|---|---|
| 4,569,962 | 2/1986 | Burguette et al. | 522/74 |
| 4,671,999 | 6/1987 | Burguette et al. | 428/422 |
| 4,705,699 | 11/1987 | Burguette et al. | 427/54.1 |
| 5,750,747 | 5/1998 | Furutani et al. | 554/36 |
| 5,759,968 | 6/1998 | Furutani et al. | 508/497 |
| 5,962,117 | 10/1999 | Furutani et al. | 428/219 |
| 5,965,496 | 10/1999 | Yamana et al. | 508/244 |

FOREIGN PATENT DOCUMENTS

| | | |
|---|---|---|
| 0473871 | 3/1991 | European Pat. Off. . |
| 3254419 | 11/1991 | Japan . |
| 4270243 | 9/1992 | Japan . |
| 6293703 | 10/1994 | Japan . |
| 7118204 | 5/1995 | Japan . |
| 7216375 | 8/1995 | Japan . |
| 7225941 | 8/1995 | Japan . |
| 7324061 | 12/1995 | Japan . |

*Primary Examiner*—Ellen M. McAvoy

[57] ABSTRACT

A lubricant containing a fluorinated dicarboxylic acid of the formula: $A^1$—COO—$R^1$—Rf—$R^2$—OCO—$A^2$ in which Rf is a divalent perfluoropolyether group; $R^1$ and $R^2$ are the same or different and represent a hydrocarbon group; and $A^1$ and $A^2$ are the same or different and represent an organic group having a carboxyl group, which allows two solid materials, for example, a magnetic recording medium and a magnetic head, to slide with low wearing at a low friction under various conditions.

12 Claims, 1 Drawing Sheet

( Fig. 1 )
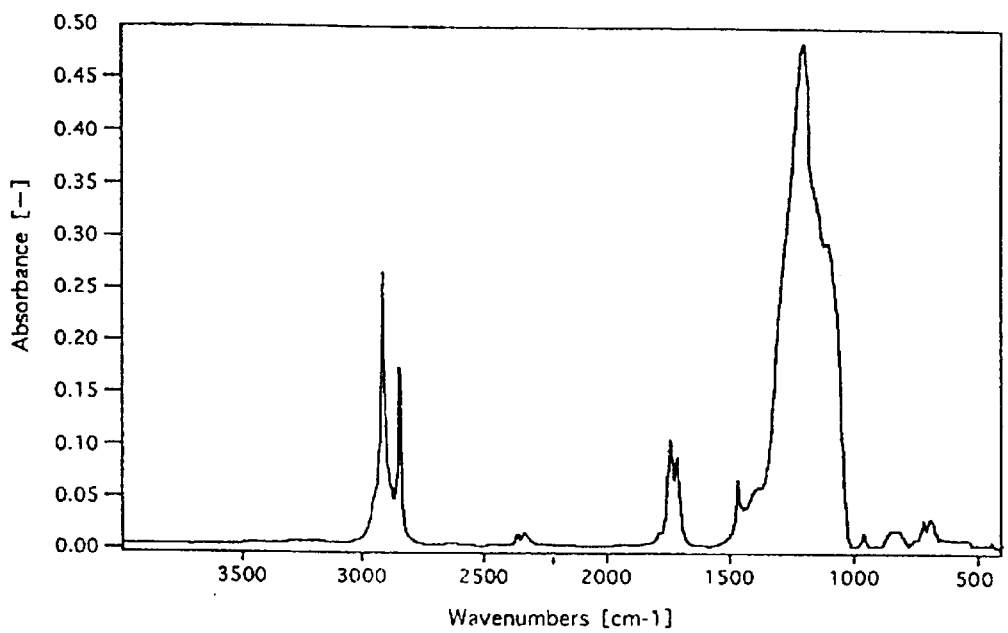

LUBRICANT AND MAGNETIC RECORDING MEDIUM COMPRISING THE SAME

FIELD OF THE INVENTION

The present invention relates to a lubricant and a magnetic recording medium comprising the same. In particular, the present invention relates to an environmentally-friendly lubricant which allows two solid materials to slide with low wearing at a low friction under any conditions, for example, at high or low temperatures and/or at high or low humidities, at a high or low sliding rate under a high or low load.

BACKGROUND OF THE INVENTION

The hardening methods of solid surfaces and lubricants have been developed to allow two contacting solid materials to slide with low wearing at a low friction and to elongate the service lives of machines, apparatuses, etc. In particular, in the field of office automation equipment, downsizing is strongly sought, such that very precision mechanisms are employed in sliding parts. Newly developing machines, in which precision parts that will continuously or discontinuously move in a sliding manner under a wide variety of conditions, should further reduce friction and wearing when the sliding movement starts, continues and stops, in comparison with conventional precision parts, so as to decrease the load on motors, etc.

In conventional protective lubrication systems, a surface layer, which is hard and difficult to wear, is formed on a sliding part, and semi-solid or liquid lubricants such as greases or oils are used as lubricants. However, for precision parts which require smoothness of contacting surfaces, no lubricant has been known, which allows two solid materials to slide with low wearing at a low friction irrespective of a high or low sliding rate, and at a high or low load, and it is still impossible to overcome problems such as starting malfunctions or the accidental and abrupt increase of a friction force.

For example, in the case of ferromagnetic metal thin film type magnetic recording media comprising a non-magnetic substrate and the thin film of a ferromagnetic metal or its alloy, which is formed on the substrate by vacuum deposition and the like, the coercive force of a magnetic layer can be easily increased, and the thickness of a magnetic layer can be decreased in comparison with coating type magnetic recording media, and thus they have a high recording density. The ferromagnetic metal thin film type magnetic recording media do not use binder resins which impart toughness to the media, and the ferromagnetic metal layer or a protective film, which is usually formed on the ferromagnetic metal layer, posseses good surface smoothness. Thus, the magnetic recording medium sticks to a magnetic head, and the coefficient of friction increases. Accordingly, such media are easily abraded or damaged, and have inferior durability and running properties.

To cope with such problems, many patent applications, for example, JP-A-3-254419, JP-A-4-270243, JP-A-6-293703, JP-A-7-118204, JP-A-7-216375, JP-A-7-225941, JP-A-7-324061, etc., propose the use of various lubricants such as perfluoropolyether lubricants (e.g. "FOMBLIN Z DOL" and "FOMBLIN AM 2001" both available from Ausimont), carboxylic acid lubricants, partially fluorinated ester lubricants, and the like, and discuss the improvement of durability and running properties by the presence of such lubricants on ferromagnetic metal thin films.

However, the use of such lubricants cannot solve encountered problems, such as dropouts caused by the contamination of magnetic heads or defects on the surfaces of recording media formed by sliding contact, or the inferior durability or running properties under high humidity circumstances.

SUMMARY OF THE INVENTION

One object of the present invention is to provide environmentally-friendly lubricant which allows two solid materials to slide with low wearing at a low friction under any conditions, for example, at high or low temperatures and/or at high or low humidities, at a high or low sliding rate under a high or low load.

Another object of the present invention is to provide a magnetic recording medium having good durability and running properties.

According to the present invention, the above objects can be achieved by a lubricant comprising a fluorinated dicarboxylic acid of the formula:

$$A^1\text{—COO—}R^1\text{—Rf—}R^2\text{—OCO—}A^2 \tag{I}$$

wherein Rf is a divalent perfluoropolyether group; $R^1$ and $R^2$ are the same or different and represent a hydrocarbon group having at least 3 carbon atoms and optionally at least one hydroxyl group; and $A^1$ and $A^2$ are the same or different and represent an organic group of the formula:

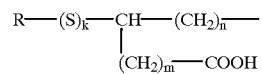

in which R is a hydrogen atom or a hydrocarbon group; and m, n and k are independently 0 or 1, and a magnetic recording medium comprising a non-magnetic substrate having a magnetic layer formed on at least one surface of the substrate, wherein the above lubricant is present in the magnetic layer or on an surface of the magnetic layer.

BRIEF DESCRIPTION OF THE DRAWING

FIG. 1 is an IR spectrum of the fluorinated dicarboxylic acid prepared in Example 1.

DETAILED DESCRIPTION OF THE INVENTION

The lubricant of the present invention comprises a fluorinated dicarboxylic acid represented by the above formula (I), which has two carboxyl groups in a molecule. Thus, it can be adsorbed by and stably present on the surface of a ferromagnetic metal thin film or a protective film, and on the surface of a magnetic head. Further, it cannot be removed from sliding surfaces under high-friction conditions, for example, at the start of a sliding movement, but is instead stably maintained and present on such surfaces. Accordingly, good sliding properties based on the lubrication characteristics of the perfluoropolyether groups are maintained, and thus the contamination of a magnetic head due to the abrasion of the media and magnetic head and dropouts can be reduced, so that the durability and running properties of magnetic recording media can be greatly improved.

In the formula (I), Rf is a perfluoropolyether group which decreases the surface free-energy of the magnetic recording media and imparts good lubricity to the magnetic recording media.

To achieve such effects more efficiently, the Rf group preferably comprises a group of the formula: —(OC$_2$F$_4$)$_p$—

$(OCF_2)_q$— in which p and q are each an integer. The number of carbon atoms in the Rf group is usually from 5 to 80, preferably from 10 to 60, more preferably from 20 to 50. When the number of carbon atoms is less than 5, the lubricity, which is charactesitic to fluorine-containing compounds, cannot be derived, and magnetic recording media do not have sufficient durability. When the number of carbon atoms exceeds 80, the above effects saturate, and the viscosity of a lubricant may increase.

$R^1$ and $R^2$ in the formula (I) are each independently a hydrocarbon group, which is preferably selected from the group consisting of alkyl groups, (poly)ether groups and (poly)ester groups, which may have at least one hydroxyl group. Herein "(poly) ether" and "(poly) ester" mean "ether or polyether" and "ester or polyester", respectively. Among them, the (poly) ether group is preferable. Since the (poly) ether group has a moderate polarity, it has good affinity with ferromagnetic metal thin layers and thus the lubricants having a (poly)ether group are stably maintained and kept on the above surfaces. Furthermore, the (poly) ether group is not decomposed even when it is adsorbed on the surface of active metals, since it has only chemically stable polyether linkages in the molecule thereof.

A hydrocarbon group comprising an alkyl group or a (poly)ether group may be a saturated or unsaturated group, as well as a linear, branched or cyclic group. In particular, those groups comprising —$(CH_2)$—, —$(OCH_2CH_2)$— or —$[OCH(CH_3)CH_2]$— are preferable. Among them, those groups comprising —$(OCH_2CH_2)$— are particularly preferable.

When such a hydrocarbon group having at least 3 carbon atoms is present between a perfluoropolyether group (Rf) and a respective ester bond, the stability of the ester bond is maintained, and decomposition of a fluorinated dicarboxylic acid is suppressed. Thus, it is possible to prevent the contamination of a magnetic head and the like with the decomposed materials of a fluorinated dicarboxylic acid. Furthermore, such a hydrocarbon group improves the solubility of the lubricant in fluorine-free solvents. Accordingly, the above hydrocarbon group should possess at least 3 carbon atoms, preferably at least 4 carbon atoms. If a hydrocarbon group has an unnecessarily large number of carbon atoms, the above effects plateau, while the viscosity of a lubricant unpreferably increases. Thus, the number of carbon atoms in a hydrocarbon group is preferably 26 or less, more preferably 18 or less. The $R^1$ and $R^2$ groups may be the same or different.

The R group in $A^1$ or $A^2$ may be a hydrogen atom or a hydrocarbon group, and preferably a hydrocarbon group. The hydrocarbon group may be a saturated or unsaturated and linear, branched or cyclic one. In particular, a saturated linear hydrocarbon group, that is, an alkyl group is particularly preferable. The number of carbon atoms in the hydrocarbon groups for the R group in $A^1$ and $A^2$ is usually in the range of between 1 and 26 from the viewpoint of a coefficient of friction, and the viscosity of the compound. Preferably, the number of carbon atoms is at least 8, more preferably from 12 to 18 to improve the solubility of a lubricant in fluorine-free solvents.

The $A^1$ and $A^2$ groups comprising the R group may be composed of the same groups or different groups.

The total number of carbon atoms in the hydrocarbon groups constituting $R^1$, $R^2$, $A^1$ and $A^2$ may be from 6 to 100, preferably from 8 to 50, more preferably from 10 to 40. Each of the hydrocarbon groups constituting $R^1$, $R^2$, $A^1$ and $A^2$ may contain one or more elements other than carbon, oxygen and hydrogen atoms, for example, nitrogen or phosphorus, to increase the sliding properties under a high load.

The molecular weight of the above fluorinated dicarboxylic acid is usually from about 1,000 to 7,000, preferably from about 2,000 to 5,000, on the average. When the molecular weight is less than about 1,000, the dicarboxylic acid evaporates and the weight loss occurs, so that the sliding properties become insufficient at high temperatures or after the storage at high temperatures. When the molecular weight exceeds about 7,000, the viscosity of the dicarboxylic acid may unpreferably increase.

Such fluorinated dicarboxylic acids are soluble in environmentally-friendly fluorine-free solvents, and have characteristics that they can be applied on articles or materials in the form of a solution in such solvents by coating, dipping or spraying. Environmentally-friendly fluorine-free solvents include general solvents such as hydrocarbons, ketones, alcohols, esters, etc. Specific examples of such solvents are hexane, heptane, octane, decane, dodecane, benzene, toluene, xylene, cyclohexane, methyl ethyl ketone, methyl isobutyl ketone, methanol, ethanol, isopropanol, diethyl ether, tetrahydrofuran, dioxane, cyclohexanone, and the like.

The fluorinated dicarboxylic acids of the present invention may be synthesized by any conventional method. One of the commercially employable synthetic methods comprises reacting 2 moles of a dicarboxylic acid or its reactive derivative (e.g. succinic anhydride, alkylsuccinic anhydrides, thiomalic anhydride, alkylthiomalic anhydrides, etc.) with 1 mole of a fluorinated diol of the formula: HO—$R^1$—Rf—$R^2$—OH in which $R^1$, $R^2$ and Rf are the same as defined above. When an acid anhydride is used as a dicarboxylic acid compound, a mixture of fluorinated dicarboxylic acids is obtained, which contains an acid of the formula (I) in which m and n in $A^1$ and $A^2$ are 0 and 1, respectively, and an acid of the formula (I) in which m and n in $A^1$ and $A^2$ are 1 and 0, respectively. Such a mixture may be used in the present invention without separation.

The present invention uses the above fluorinated dicarboxylic acid as a lubricant. In such a case, the lubricant of the present invention may be used in combination with any conventional lubricant. Examples of the conventional lubricant include aliphatic acids or their metal salts, aliphatic acid esters, aliphatic acid amides, aliphatic alcohols, aliphatic amines, monosulfides, paraffins, silicone compounds, monoesters of aliphatic acids and fluorinated alcohols, perfluoropolyethers, polytetrafluoroethylene, and the like. The amount of the conventional lubricant is from about 0.01 to 100 moles, preferably from about 0.1 to 10 moles, per 1 mole of the fluorinated dicarboxylic acid of the present invention.

When the fluorinated dicarboxylic acid is used as a lubricant, it may be possible to concurrently use one or more extreme-pressure agents. Examples of the extreme-pressure agents include phosphorus base extreme-pressure agents such as trioleyl phosphate; sulfur base extreme-pressure agents such as benzyl disulfide; halogen base extreme-pressure agents such as allyl bromide; organometallic extreme-pressure agents such as zinc diisobutylthiophosphate; and the like.

The magnetic recording medium of the present invention comprises a non-magnetic substrate, and a magnetic layer formed on at least one surface of the substrate, and it is characterized in that a lubricant comprising the fluorinated dicarboxylic acid of the present invention is present in the magnetic layer or on a surface of the magnetic layer. To supply the lubricant in the magnetic layer or on a surface of the magnetic layer, the lubricant of the present invention is dissolved in the above-described fluorine-free solvent, and the solution is applied on a magnetic layer formed on at least one surface of a non-magnetic substrate by coating or spraying and then drying, or a substrate carrying a magnetic layer is dipped in the solution and then dried. The application method is suitably selected according to the type of magnetic layer to which the lubricant is being applied.

When a magnetic layer contains a ferromagnetic metal thin film, a protective film can be formed on the magnetic layer. A protective film may be a film comprising carbon (e.g. diamond-like carbon, amorphous carbon, etc.), carbon nitride, silicon oxide, zirconium oxide or chromium oxide, which can be formed by vacuum deposition, sputtering, plasma, etc., or a film comprising organic compounds. Such protective films may contain fluorine, nitrogen or silicon atoms. Furthermore, the surface of a ferromagnetic metal thin film may carry a very small amount of moisture, or may be coated with anti-corrosives such as benzotriazole base anti-corrosives.

The surface of a protective film such as a carbon protective film may be treated with oxygen or ammonia plasma. The plasma treatment can clean the surface of the protective film and deposit, on the surface thereof, chemically active species formed in the plasma, so that the lubricant can more stably be present without deteriorating the hardness of the protective film. For example, the lubricant can be caused to be more stably present by a treatment with glow discharge, UV-ray irradiation, heating, etc. Such a treatment may be carried out prior to or after application of the lubricant. Likewise, such a treatment may be carried out after excessive lubricant is wiped off from the magnetic layer using solvents.

The applied amount of lubricant applied onto a ferromagnetic metal thin film is preferably from about 0.5 to 20 mg/n². When the applied amount of lubricant is less than about 0.5 mg/m², it is difficult to uniformly apply the lubricant over the surface of the thin film, and thus "still durability" may not be satisfactorily improved. Likewise, when the applied amount of lubricant exceeds about 20 mg/m², the ferromagnetic metal thin film tends to stick to a magnetic head. The applied amount of lubricant can be measured by X-ray photoelectron spectroscopy or liquid column chromatography.

A non-magnetic substrate, when used in the present invention, may be any conventional substrate for magnetic recording media. Preferable examples of materials for non-magnetic substrates include plastics (e.g. polyethylene terephthalate, polyethylene naphthalate, polycarbonate, polyamide, polyimide, polyvinyl chloride, etc.), glass, aluminum alloys, titanium alloys, and the like.

The non-magnetic substrate may be in the form of a tape, a sheet, a disc, a card, etc. Furthermore, the non-magnetic substrate may have projections on its surface.

In the case of ferromagnetic metal thin film type magnetic recording media, the thin film of a ferromagnetic material is formed on one or both surfaces of a non-magnetic substrate by vacuum deposition, ion plating, sputtering, plating, etc. Examples of ferromagnetic materials include Co, Ni, Fe, Co-Ni, Co-Cr, Co-P, Co-Ni-P, Fe-Co-B, Fe-Co-Ni, Co-Ni-Fe-B, Fe-Ni, Fe-Co, Co-Pt, Co-Ni-Pt, and such metals or metal alloys containing oxygen.

The thickness of such a thin film is preferably in the range of between 0.03 and 1 μm.

When a magnetic layer is formed only on one surface of the non-magnetic substrate of the magnetic recording medium of the present invention, a back-coating layer may be formed on the other surface of the non-magnetic substrate. The back-coating layer can be formed by mixing and dispersing a non-magnetic powder in a binder resin and an organic solvent to prepare a paint for a back-coating layer, applying the paint on the other surface of the non-magnetic layer, and then drying it.

Examples of non-magnetic powders are carbon black, red oxide, calcium carbonate, etc., and examples of binder resins are vinyl chloride-vinyl acetate copolymers, polyurethane resins, cellulose resins, etc.

PREFERRED EMBODIMENTS OF THE INVENTION

The present invention will be illustrated by the following examples, which do not limit the scope of the present invention in any way.

EXAMPLE 1

One mole of a fluorinated diol of the formula:

wherein r, p and q are the same or different and represent an integer of 1 or more ("FOMBLIN Z DOL TX2000" available from Ausimont; molecular weight=2,200) and 2 moles of n-octadecylsuccinic anhydride were charged in a flask equipped with a stirrer and reacted under a nitrogen stream at 100° C. for 48 hours. After completion of the reaction, the reaction mixture was dissolved in a fluorine-containing solvent ("FC 77" available from 3M), and the solution was cooled to −10° C. to remove the unreacted fluorinated diol. Then, the reaction product was treated with benzene in the same way as above to remove unreacted n-octadecylsuccinic anhydride, to obtain a fluorinated dicarboxylic acid, which is used as a lubricant.

The IR spectrum of this compound is shown in FIG. 1, in which the peaks assigned to the ester bonds and carboxyl groups are found around 1,740 cm$^{-1}$ and 1,700 cm$^{-1}$, respectively. This spectrum confirmed that the produced compound is a fluorinated dicarboxylic acid of formula (I) in which $R^1$, Rf and $R^2$ are groups derived from the above fluorinated diol, the R groups in $A^1$ and $A^1$ are n-octadecyl groups, and k is 0 (zero).

EXAMPLE 2

One mole of the same fluorinated diol as that used in Example 1 and 2 moles of n-dodecylsuccinic anhydride were charged in a flask equipped with a stirrer and reacted under a nitrogen stream at 100° C. for 48 hours. After completion of the reaction, the reaction mixture was dissolved in the same fluorine-containing solvent as that used in Example 1, and the solution was cooled to −10° C. to remove the unreacted fluorinated diol. Then, the reaction product was treated with benzene in the same way as above to remove unreacted n-dodecylsuccinic anhydride, to obtain a fluorinated dicarboxylic acid, which is used as a lubricant.

The IR spectrum of this compound confirmed that the compound is a fluorinated dicarboxylic acid having the same structure as that of the product of Example 1 except that the R groups are n-dodecyl groups.

EXAMPLE 3

One mole of the same fluorinated diol as that used in Example 1 and 2 moles of n-octylsuccinic anhydride were charged in a flask equipped with a stirrer and reacted under a nitrogen stream at 100° C. for 48 hours. After completion of the reaction, the reaction mixture was dissolved in the same fluorine-containing solvent as that used in Example 1, and the solution was cooled to −10° C. to remove the unreacted fluorinated diol. Then, the reaction product was treated with benzene in the same way as above to remove unreacted n-octylsuccinic anhydride, to obtain a fluorinated dicarboxylic acid, which is used as a lubricant.

The IR spectrum of this compound confirmed that the compound is a fluorinated dicarboxylic acid having the same structure as that of the product of Example 1 except that the R groups are n-octyl groups.

EXAMPLE 4

One mole of the same fluorinated diol as that used in Example 1 and 2 moles of succinic anhydride were charged in a flask equipped with a stirrer and reacted under a nitrogen stream at 100° C. for 48 hours. After completion of the reaction, the reaction mixture was dissolved in the same fluorine-containing solvent as that used in Example 1, and the solution was cooled to −10° C. to remove the unreacted fluorinated diol. Then, the reaction product was treated with benzene in the same way as above to remove unreacted succinic anhydride, to obtain a fluorinated dicarboxylic acid, which is used as a lubricant.

The IR spectrum of this compound confirmed that the compound is a fluorinated dicarboxylic acid having the same structure as that of the product of Example 1 except that the R groups are hydrogen atoms.

EXAMPLE 5

One mole of the same fluorinated diol as that used in Example 1 and 2 moles of isooctadecylsuccinic anhydride were charged in a flask equipped with a stirrer and reacted under a nitrogen stream at 100° C. for 48 hours. After completion of the reaction, the reaction mixture was dissolved in the same fluorine-containing solvent as that used in Example 1, and the solution was cooled to −10° C. to remove the unreacted fluorinated diol. Then, the reaction product was treated with benzene in the same way as above to remove unreacted isooctadecylsuccinic anhydride, to obtain a fluorinated dicarboxylic acid, which is used as a lubricant.

The IR spectrum of this compound confirmed that the compound is a fluorinated dicarboxylic acid having the same structure as that of the product of Example 1 except that the R groups are isooctadecyl groups.

EXAMPLE 6

One mole of the same fluorinated diol as that used in Example 1 and 2 moles of octadecenylsuccinic anhydride were charged in a flask equipped with a stirrer and reacted under a nitrogen stream at 100° C. for 48 hours. After completion of the reaction, the reaction mixture was dissolved in the same fluorine-containing solvent as that used in Example 1, and the solution was cooled to −10° C. to remove the unreacted fluorinated diol. Then, the reaction product was treated with benzene in the same way as above to remove unreacted octadecenylsuccinic anhydride, to obtain a fluorinated dicarboxylic acid, which is used as a lubricant.

The IR spectrum of this compound confirmed that the compound is a fluorinated dicarboxylic acid having the same structure as that of the product of Example 1 except that the R groups are octadecenyl groups.

EXAMPLE 7

One mole of the same fluorinated diol as that used in Example 1 and 2 moles of n-octadecylthiomalic anhydride were charged in a flask equipped with a stirrer and reacted under a nitrogen stream at 100° C. for 48 hours. After completion of the reaction, the reaction mixture was dissolved in the same fluorine-containing solvent as that used in Example 1, and the solution was cooled to −10° C. to remove the unreacted fluorinated diol. Then, the reaction product was treated with benzene in the same way as above to remove unreacted n-octadecylthiomalic anhydride, to obtain a fluorinated dicarboxylic acid, which is used as a lubricant.

The IR spectrum of this compound confirmed that the compound is a fluorinated dicarboxylic acid having the same structure as that of the product of Example 1 except that the R groups are n-octadecyl groups and k is 1.

EXAMPLE 8

One mole of a fluorinated diol of the formula:

$$HOCH_2CH(OH)CH_2OCH_2CF_2(OC_2F_4)_p(OCF_2)_qO$$
$$CF_2CH_2OCH_2CH(OH)CH_2OH$$

wherein p and q are the same or different and represent an integer of 1 or more ("FOMBLIN Z TETRAOL" available from Ausimont; molecular weight=2,200) and 2 moles of n-octadecylsuccinic anhydride were charged in a flask equipped with a stirrer and reacted under a nitrogen stream at 100° C. for 48 hours. After completion of the reaction, the reaction mixture was dissolved in the same fluorine-containing solvent as that used in Example 1, and the solution was cooled to −10° C. to remove the unreacted fluorinated diol. Then, the reaction product was treated with benzene in the same way as above to remove unreacted n-octadecylsuccinic anhydride, to obtain a fluorinated dicarboxylic acid, which is used as a lubricant.

The IR spectrum of this compound confirmed that the compound is a fluorinated dicarboxylic acid of the formula (I) in which $R^1$, Rf and $R^2$ are the groups derived from the above fluorinated diol, The R groups in $A^1$ and $A^1$ are n-octadecyl groups, and k is 0 (zero).

EXAMPLE 9

One mole of the same fluorinated diol as that used in Example 8 and 2 moles of n-dodecylsuccinic anhydride were charged in a flask equipped with a stirrer and reacted under a nitrogen stream at 100° C. for 48 hours. After completion of the reaction, the reaction mixture was dissolved in the same fluorine-containing solvent as that used in Example 1, and the solution was cooled to −10° C. to remove the unreacted fluorinated diol. Then, the reaction product was treated with benzene in the same way as above to remove unreacted n-dodecylsuccinic anhydride, to obtain a fluorinated dicarboxylic acid, which is used as a lubricant.

The IR spectrum of this compound confirmed that the compound is a fluorinated dicarboxylic acid having the same structure as that of the product of Example 8 except that the R groups are n-dodecyl groups.

EXAMPLE 10

One mole of the same fluorinated diol as that used in Example 8 and 2 moles of n-octylsuccinic anhydride were charged in a flask equipped with a stirrer and reacted under a nitrogen stream at 100° C. for 48 hours. After completion of the reaction, the reaction mixture was dissolved in the same fluorine-containing solvent as that used in Example 1, and the solution was cooled to −10° C. to remove the unreacted fluorinated diol. Then, the reaction product was treated with benzene in the same way as above to remove unreacted n-octylsuccinic anhydride, to obtain a fluorinated dicarboxylic acid, which is used as a lubricant.

The IR spectrum of this compound confirmed that the compound is a fluorinated dicarboxylic acid having the same structure as that of the product of Example 8 except that the R groups are n-octyl groups.

EXAMPLE 11

One mole of the same fluorinated diol as that used in Example 8 and 2 moles of succinic anhydride were charged in a flask equipped with a stirrer and reacted under a nitrogen stream at 100° C. for 48 hours. After completion of the reaction, the reaction mixture was dissolved in the same fluorine-containing solvent as that used in Example 1, and the solution was cooled to −10° C. to remove the unreacted fluorinated diol. Then, the reaction product was treated with benzene in the same way as above to remove unreacted succinic anhydride, to obtain a fluorinated dicarboxylic acid, which is used as a lubricant.

The IR spectrum of this compound confirmed that the compound is a fluorinated dicarboxylic acid having the same structure as that of the product of Example 8 except that the R groups are hydrogen atoms.

EXAMPLE 12

One mole of the same fluorinated diol as that used in Example 8 and 2 moles of isooctadecylsuccinic anhydride were charged in a flask equipped with a stirrer and reacted under a nitrogen stream at 100° C. for 48 hours. After completion of the reaction, the reaction mixture was dissolved in the same fluorine-containing solvent as that used in Example 1, and the solution was cooled to −10° C. to remove the unreacted fluorinated diol. Then, the reaction product was treated with benzene in the same way as above to remove unreacted isooctadecylsuccinic anhydride, to obtain a fluorinated dicarboxylic acid, which is used as a lubricant.

The IR spectrum of this compound confirmed that the compound is a fluorinated dicarboxylic acid having the same structure as that of the product of Example 8 except that the R groups are isooctadecyl groups.

EXAMPLE 13

One mole of the same fluorinated diol as that used in Example 8 and 2 moles of octadecenylsuccinic anhydride were charged in a flask equipped with a stirrer and reacted under a nitrogen stream at 100° C. for 48 hours. After completion of the reaction, the reaction mixture was dissolved in the same fluorine-containing solvent as that used in Example 1, and the solution was cooled to −10° C. to remove the unreacted fluorinated diol. Then, the reaction product was treated with benzene in the same way as above to remove unreacted octadecenylsuccinic anhydride, to obtain a fluorinated dicarboxylic acid, which is used as a lubricant.

The IR spectrum of this compound confirmed that the compound is a fluorinated dicarboxylic acid having the same structure as that of the product of Example 8 except that the R groups are octadecenyl groups.

EXAMPLE 14

One mole of the same fluorinated diol as that used in Example 8 and 2 moles of n-octadecylthiomalic anhydride were charged in a flask equipped with a stirrer and reacted under a nitrogen stream at 100° C. for 48 hours. After completion of the reaction, the reaction mixture was dissolved in the same fluorine-containing solvent as that used in Example 1, and the solution was cooled to −10° C. to remove the unreacted fluorinated diol. Then, the reaction product was treated with benzene in the same way as above to remove unreacted n-octadecylthiomalic anhydride, to obtain a fluorinated dicarboxylic acid, which is used as a lubricant.

The IR spectrum of this compound confirmed that the compound is a fluorinated dicarboxylic acid having the same structure as that of the product of Example 8 except that the R groups are n-octadecyl groups and k is 1.

COMPARATIVE EXAMPLE 1

A fluorinated diol of the formula:

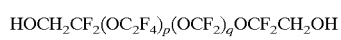

$HOCH_2CF_2(OC_2F_4)_p(OCF_2)_qOCF_2CH_2OH$ ("FOMBLIN Z DOL" available from Ausimont; molecular weight=2,000) was used as a lubricant.

COMPARATIVE EXAMPLE 2

One mole of the same fluorinated diol as that used in Comparative Example 1 and 2 moles of n-octadecylsuccinic anhydride were reacted in the same manner as in Example 1 to obtain a fluorinated dicarboxylic acid, which is used as a lubricant. The IR spectrum of this compound confirmed that the compound is a fluorinated dicarboxylic acid having the same structure as that of the product of Example 1 except that the $R^1$ and $R^2$ groups are both methylene groups.

COMPARATIVE EXAMPLE 3

One mole of a fluorinated monohydric alcohol of the formula:

$F(CF_2)_8CH_2CH_2OH$ and 1 mole of n-octadecylsuccinic anhydride were reacted to obtain a fluorinated monobasic carboxylic acid of the formula:

$F(CF_2)_8CH_2CH_2OCOCH_2CH(COOH)(CH_2)_{16}H$ which is used as a lubricant.

COMPARATIVE EXAMPLE 4

One mole of a fluorinated monohydric alcohol of the formula:

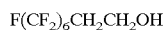

$F(CF_2)_6CH_2CH_2OH$ and 2 moles of decanedicarboxylic acid were reacted to obtain a fluorinated diester of the formula:

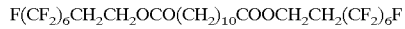

$F(CF_2)_6CH_2CH_2OCO(CH_2)_{10}COOCH_2CH_2(CF_2)_6F$ which is used as a lubricant.

With the lubricants obtained in the Examples and Comparative Examples, their solubility in a fluorine-free solvent and their volatility in a high temperature atmosphere were measured by the following methods. The results are shown in Table 1.

Solubility

A lubricant is added portionwise to methyl isobutyl ketone, and stirred well. When 0.05 wt. % or more of the lubricant dissolved, the solubility was ranked GOOD, while when less than 0.05 wt. % of the lubricant dissolved, the solubility was ranked POOR.

Volatility

Using a lubricant, a videotape was produced by the hereinafter described method of Examples 15–28 and Comparative Examples 5–8. The videotape was stored at 60° C., 20% RH or at 60° C., 80% RH, for 100 hours. Then, the volatility of the lubricant was evaluated using a test for determining "decreased rate of a lubricant".

The "decreased rate of a lubricant" was determined by measuring the intensity of a peak of Fls by X-ray photoelectron spectroscopy before and after storage.

TABLE 1

| Example No. | Solubility | Volatility (decreased rate: %) | |
|---|---|---|---|
| | | 60° C., 20% RH | 60° C., 80% RH |
| Ex. 1 | GOOD | 3.0 | 3.1 |
| Ex. 2 | GOOD | 3.2 | 3.5 |
| Ex. 3 | GOOD | 3.3 | 3.8 |
| Ex. 4 | GOOD | 3.8 | 3.9 |
| Ex. 5 | GOOD | 3.5 | 3.5 |
| Ex. 6 | GOOD | 3.2 | 3.4 |
| Ex. 7 | GOOD | 3.0 | 3.9 |
| Ex. 8 | GOOD | 2.5 | 2.8 |
| Ex. 9 | GOOD | 2.7 | 3.2 |
| Ex. 10 | GOOD | 2.9 | 3.2 |
| Ex. 11 | GOOD | 3.4 | 3.5 |
| Ex. 12 | GOOD | 3.1 | 3.0 |
| Ex. 13 | GOOD | 2.8 | 2.9 |
| Ex. 14 | GOOD | 2.7 | 3.2 |
| C. Ex. 1 | POOR | 3.2 | 3.8 |
| C. Ex. 2 | GOOD | 4.0 | 5.0 |
| C. Ex. 3 | GOOD | 10.4 | 13.1 |
| C. Ex. 4 | GOOD | 12.0 | 16.3 |

As can be understood from the results in Table 1, the lubricants of Examples 1–14 and Comparative Example 2 have good solubility in a fluorine-free solvent. Thus, they are environmentally-friendly lubricants, since they can be applied onto articles or materials using such a fluorine-free solvent. Furthermore, they have low volatility in a high temperature atmosphere, and thus they have required properties to maintain lubricity.

In contrast with the lubricants of Examples 1–14, the lubricant of Comparative Example 1 has poor solubility in a fluorine-free solvent. Thus, it should be applied onto articles or materials using fluorine-containing solvents which may cause environmental pollution. The lubricants of Comparative Examples 3 and 4 have high volatility in a high temperature atmosphere, and thus they do not have required properties to maintain tir lubricity.

EXAMPLES 15–28

A polyethylene terephthlate film having a thickness of 6 $\mu$m was provided as a non-magnetic substrate. Then, cobalt was obliquely vapor deposited on the substrate in an oxygen atmosphere to form a ferromagnetic metal thin film consisting of cobalt oxide (Co-O) having a thickness of 0.15 $\mu$m. After that, a protective film of diamond-like carbon (DLC) having a thickness of 10 nm was formed by a plasma polymerization method with RF of 13.56 MHz using ethylene as a monomer gas and hydrogen gas as a carrier gas. After the formation of the protective film, the coated substrate film was slit to obtain a tape having a width of 8 mm.

Thereafter, each of the lubricants of Examples 1–14 was dissolved in a mixed solvent of n-hexane, methyl ethyl ketone and isopropanol in a weight ratio of 5:3:2 at a concentration of 2 wt. % to prepare the solution of a lubricant.

The above tape was dipped in this solution, pulled out and dried to obtain a videotape having a lubricant layer on the protective film.

COMPARATIVE EXAMPLES 5–8

A videotape was produced in the same manner as in Examples 15–28 except that each of the lubricants of Comparative Examples 1–4 was used.

When the lubricant of Comparative Example 1 was used, perfluorooctane was used as a solvent.

Each of the videotapes of Examples 15–28 and Comparative Examples 5–8 was subjected to the measurements of still durability, a coefficient of friction and head contamination by the following methods. The results are shown in Table 2.

Still durability

After a videotape was stored at 60° C., 80% RH for 100 hours, it was set on a cylinder having a diameter of 4 cm for a 8 mm videocasette recorder (VCR) at a winding angle of 220 degrees at 20° C., 5% RH. Then, a sine curve having a wavelength of 1.6 $\mu$m was recorded on the videotape at a relative speed of 11.3 m/sec. between the tape and a magnetic head under a tape tension of 12.5 gf, and a playback output was measured in a still mode. The "still life" value reported in Table 2 is the time in which it takes the playback output to decrease to a half of the original value.

Coefficient of friction

After a videotape was stored at 60° C., 80% RH for 100 hours, it was subjected to a reciprocal sliding test by sliding the tape against a stainless steel pin at 20° C., 50% RH at a sliding speed of 1 m/min. under a tape tension of 20 gf with a sliding distance of 5 cm.

Head contamination

After a videotape was stored at 60° C., 80% RH for 100 hours, 50 m of the videotape was repeatedly traveled 100 times in a 8 mm VCR (EV-S 900 manufactured by SONY CORPORATION) at 20° C., 5% RH. Then, the head contamination was evaluated according to the following criteria:

A: No head contamination was observed.

B: Slight head contamination was observed.

C: Heavy head contamination was observed.

TABLE 2

| Example No. | Lubricant | Still life (min.) | Coefficient of friction | Head contamination |
|---|---|---|---|---|
| Ex. 15 | Ex. 1 | >120 | 0.21 | A |
| Ex. 16 | Ex. 2 | >120 | 0.22 | A |
| Ex. 17 | Ex. 3 | >120 | 0.28 | A |
| Ex. 18 | Ex. 4 | >120 | 0.29 | A |
| Ex. 19 | Ex. 5 | >120 | 0.23 | A |
| Ex. 20 | Ex. 6 | >120 | 0.25 | A |
| Ex. 21 | Ex. 7 | >120 | 0.19 | A |
| Ex. 22 | Ex. 8 | >120 | 0.20 | A |
| Ex. 23 | Ex. 9 | >120 | 0.21 | A |
| Ex. 24 | Ex. 10 | >120 | 0.25 | A |
| Ex. 25 | Ex. 11 | >120 | 0.24 | A |
| Ex. 26 | Ex. 12 | >120 | 0.22 | A |
| Ex. 27 | Ex. 13 | >120 | 0.24 | A |
| Ex. 28 | Ex. 14 | >120 | 0.20 | A |
| C. Ex. 5 | C. Ex. 1 | >120 | 0.24 | A |
| C. Ex. 6 | C. Ex. 2 | 60 | 0.23 | C |
| C. Ex. 7 | C. Ex. 3 | 100 | 0.22 | B |
| C. Ex. 8 | C. Ex. 4 | 40 | 0.25 | C |

As can be understood from the results in Table 2, the videotapes of Examples 15–28 have low coefficients of friction and long still lives, and do not cause head contamination.

In contrast with the videotapes of Examples 15–18, in Comparative Example 5, a fluorine-containing solvent needs to be used to prepare a solution of the lubricant, and thus causes environmental pollution, although the videotape of Comparative Example 5 has the same lubricity as those of Examples 15–28. In the case of the videotape of Comparative Example 6, the lubricant used has good solubility in fluorine-free solvents and low volatility, but it is easily hydrolyzed. Thus, the videotape has a short still life and causes head contamination.

The videotapes of Comparative Examples 7 and 8 have short still lives and cause heavy head contamination, since the lubricants used have high volatility.

What is claimed is:

1. A lubricant comprising a fluorinated dicarboxylic acid of the formula:

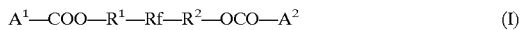     (I)

wherein Rf is a divalent perfluoropolyether group; $R^1$ and $R^2$ are the same or different and represent a hydrocarbon group having at least 3 carbon atoms and optionally at least one hydroxyl group; and $A^1$ and $A^2$ are the same or different and represent an organic group of the formula:

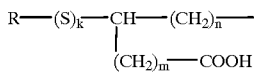

in which R is a hydrogen atom or a hydrocarbon group; and m, n and k are independently 0 or 1.

2. A lubricant according to claim 1, wherein Rf in the formula (I) is a perfluroroalkyl group having 5 to 80 carbon atoms, which comprises a group of the formula:

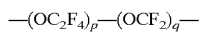

in which p and q are each an integer.

3. A lubricant according to claim 1, wherein the hydrocarbon group constituting $R^1$ and $R^2$ in the formula (I) is selected from the group consisting of an alkyl group, a (poly) ether group and a (poly) ester group, each of which may have at least one hydroxyl group.

4. A lubricant according to claim 1, wherein the hydrocarbon group constituting $R^1$ and $R^2$ in formula (I) contains at least 4 carbon atoms.

5. A lubricant according to claim 1, wherein the R group constituting $A^1$ and $A^2$ in formula (I) contains at least 8 carbon atoms.

6. A lubricant according to claim 1, wherein said fluorinated dicarboxylic acid of formula (I) has an average molecular weight of from 1,000 to 7,000.

7. A lubricant according to claim 1, wherein said fluorinated dicarboxylic acid of formula (I) is soluble in a fluorine-free solvent.

8. A lubricant according to claim 1, wherein said fluorine-free solvent contains at least one solvent selected from the group consisting of hydrocarbons, ketones, alcohols and esters.

9. A magnetic recording medium comprising a non-magnetic substrate and a magnetic layer formed on at least one surface of the substrate, wherein a lubricant, which comprises a fluorinated dicarboxylic acid of the formula:

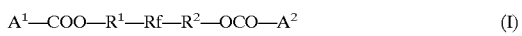     (I)

wherein Rf is a divalent perfluoropolyether group; $R^1$ and $R^2$ are the same or different and represent a hydrocarbon group having at least 3 carbon atoms and optionally at least one hydroxyl group; and $A^1$ and $A^2$ are the same or different and represent an organic group of the formula:

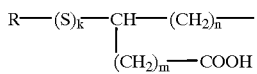

in which R is a hydrogen atom or a hydrocarbon group; and m, n and k are independently 0 or 1, is present in the magnetic layer or on a surface of the magnetic layer.

10. A magnetic recording medium according to claim 9, wherein said magnetic layer comprises a thin film of a ferromagnetic metal, and a coating of said lubricant in an amount of from 0.5 to 20 mg/m$^2$.

11. A magnetic recording medium according to claim 10, which further comprises a protective film on said thin film of the ferromagnetic metal as a magnetic layer.

12. A magnetic recording medium according to claim 11, wherein said protective film comprises at least one material selected from the group consisting of carbon, carbon nitride, silicon oxide, zirconium oxide and chromium oxide.

* * * * *